United States Patent
Omeis et al.

(10) Patent No.: US 11,352,514 B1
(45) Date of Patent: Jun. 7, 2022

(54) DUAL-CURABLE INKJET COMPOSITION

(71) Applicant: ALTANA New Technologies GmbH, Wesel (DE)

(72) Inventors: Jürgen Omeis, Wesel (DE); Filipp Petrov, Lehrte (DE); Frank Walter, Wesel (DE); Max Röttger, Lehrte (DE); Anne Asmacher, Freiburg (DE); Rolf Mühlhaupt, Freiburg (DE)

(73) Assignee: ALTANA NEW TECHNOLOGIES GMBH, Wesel (DE)

( * ) Notice: Subject to any disclaimer, the term of this patent is extended or adjusted under 35 U.S.C. 154(b) by 0 days.

(21) Appl. No.: 17/342,819

(22) Filed: Jun. 9, 2021

(51) Int. Cl.
| | |
|---|---|
| *C08F 2/46* | (2006.01) |
| *C08F 2/50* | (2006.01) |
| *C08G 61/04* | (2006.01) |
| *C09D 11/00* | (2014.01) |
| *C09D 1/00* | (2006.01) |
| *C09D 11/101* | (2014.01) |
| *B33Y 40/20* | (2020.01) |
| *C08F 220/18* | (2006.01) |
| *C08F 222/10* | (2006.01) |
| *C08F 2/48* | (2006.01) |
| *C08F 226/06* | (2006.01) |
| *C08F 283/10* | (2006.01) |
| *C08G 18/73* | (2006.01) |
| *C08G 18/28* | (2006.01) |
| *C08K 5/00* | (2006.01) |
| *B33Y 70/00* | (2020.01) |
| *B33Y 80/00* | (2015.01) |
| *B33Y 10/00* | (2015.01) |
| *B29C 64/112* | (2017.01) |
| *C09D 11/30* | (2014.01) |

(52) U.S. Cl.
CPC ............ *C09D 11/101* (2013.01); *B29C 64/112* (2017.08); *B33Y 10/00* (2014.12); *B33Y 40/20* (2020.01); *B33Y 70/00* (2014.12); *B33Y 80/00* (2014.12); *C08F 2/48* (2013.01); *C08F 220/1811* (2020.02); *C08F 222/103* (2020.02); *C08F 226/06* (2013.01); *C08F 283/10* (2013.01); *C08G 18/2855* (2013.01); *C08G 18/73* (2013.01); *C08K 5/0025* (2013.01); *C09D 11/30* (2013.01)

(58) Field of Classification Search
CPC ............... C08F 2/46; C08F 2/50; C08G 61/04
USPC ...................... 522/6, 71, 189, 184, 1; 520/1
See application file for complete search history.

(56) References Cited

U.S. PATENT DOCUMENTS

| | | | |
|---|---|---|---|
| 2019/0381726 A1* | 12/2019 | Moore | ................. B29C 70/745 |
| 2020/0277442 A1* | 9/2020 | Borjigin | ................ B29C 64/106 |

FOREIGN PATENT DOCUMENTS

| | | | | |
|---|---|---|---|---|
| CN | 110128773 A | 8/2019 | | |
| WO | 2008127930 A1 | 10/2008 | | |
| WO | 2016160346 A1 | 10/2016 | | |
| WO | 2017040883 A1 | 3/2017 | | |
| WO | 2020065655 A1 | 4/2020 | | |
| WO | 2020109769 A1 | 6/2020 | | |
| WO | WO-2020131675 A1 * | 6/2020 | ......... | C08G 18/3234 |

* cited by examiner

*Primary Examiner* — Jessica Whiteley
(74) *Attorney, Agent, or Firm* — Fitch, Even, Tabin & Flannery LLP

(57) ABSTRACT

An inkjet composition for additive manufacturing includes at least one photocurable compound, at least one thermocurable compound and a photoinitiator, wherein the at least one photocurable compound and the at least one thermocurable compound are different compounds. A method for manufacturing a three-dimensional object includes dispensing and curing an inkjet composition.

20 Claims, 1 Drawing Sheet

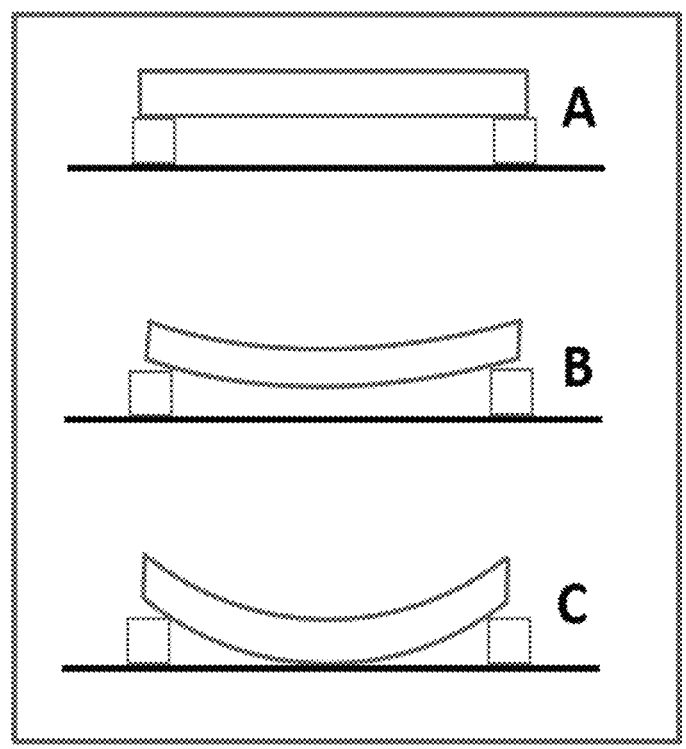

DUAL-CURABLE INKJET COMPOSITION

TECHNICAL FIELD

The present disclosure relates to an inkjet composition for additive manufacturing and a method for manufacturing a three-dimensional object using the same as well as uses thereof. In some forms the disclosure relates to a composition having a viscosity stability in that the viscosity measured after 168 h does not change from the initial viscosity by more than 300% at 60° C. and comprising at least one photocurable compound, at least one thermocurable compound and a photoinitiator, wherein the at least one photocurable compound and the at least one thermocurable compound are different compounds,

TECHNICAL BACKGROUND

Additive manufacturing describes the construction of three-dimensional objects from viscous composition such as inter alia ink compositions.

Additive manufacturing can refer to a variety of processes in which materials are joined or solidified for example under computer control to create a three-dimensional object, with material being added together (such as liquid molecules or powder grains being fused together), typically layer by layer.

When an inkjet dispensing apparatus is used for additive manufacturing, the inkjet composition should have certain properties to meet the needs of the industry. Desirable properties of inkjet compositions include a good balance between low viscosity, viscosity stability of the ink composition in the printer, sufficient thermal reactivity of the composition in the curing process, as well as balanced thermoset and/or thermoplastic properties of a formed object after the curing process.

DESCRIPTION OF THE FIGURE

FIG. 1—Classification of the green body strength.

DETAILED DESCRIPTION

An inkjet composition for additive manufacturing can generally have a viscosity stability such that a viscosity of the inkjet composition measured after storage for 168 h at 60° C. does not increase by more than 300% from an initial viscosity at 60° C. after mixing components of the inkjet composition. An inkjet composition can comprise at least one photocurable compound, at least one thermocurable compound and a photoinitiator, wherein the at least one photocurable compound and the at least one thermocurable compound are different compounds. In some forms, inkjet composition comprises at least one photocurable compound including one or more acryloyl groups, at least one thermocurable compound including one or more thermal curable groups, and a photoinitiator.

An inkjet composition describes a composition which is dispensable using an inkjet dispensing apparatus. In order to be considered as an inkjet composition, the composition must have a viscosity which allows it to be dispensed on a substrate via the ink dispensing means, such as a nozzle of a printing head of an inkjet printing apparatus.

The inkjet composition usually has a viscosity of 1 to 60 mPa·s at 60° C.

Preferably, the inkjet composition has a viscosity of 1 to 60 mPa·s, more preferably 2 to 50 mPa·s, more preferably 3 to 40 mPa·s, more preferably of 4 to 30 mPa·s and even more preferably of 5 to 20 mPa·s, at 60° C. The inkjet composition may preferably have a viscosity of 1 to 60 mPa·s, more preferably 2 to 50 mPa·s, more preferably 3 to 40 mPa·s, more preferably of 4 to 30 mPa·s and even more preferably of 5 to 20 mPa·s, at 55° C. The inkjet composition may preferably have a viscosity of 1 to 60 mPa·s, more preferably 2 to 50 mPa·s, more preferably 3 to 40 mPa·s, more preferably of 4 to 30 mPa·s and even more preferably of 5 to 20 mPa·s, at 45° C. The inkjet composition may preferably have a viscosity of 1 to 60 mPa·s, more preferably 2 to 50 mPa·s, more preferably 3 to 40 mPa·s, more preferably of 4 to 30 mPa·s and even more preferably of 5 to 20 mPa·s, at 40° C.

Preferably, the inkjet composition may have a viscosity of not more than 50 mPa·s at 60° C., more preferably of not more than 50 mPa·s at 55° C., even more preferably of not more than 50 mPa·s at 45° C. or not more than 50 mPa·s at 40° C. The inkjet composition may preferably have a viscosity of not more than 40 mPa·s at 60° C., more preferably of not more than 40 mPa·s at 55° C., even more preferably of not more than 40 mPa·s at 45° C. or not more than 40 mPa·s at 40° C. The inkjet composition may preferably have a viscosity of not more than 30 mPa·s at 60° C., more preferably of not more than 30 mPa·s at 55° C., even more preferably of not more than 30 mPa·s at 45° C. or not more than 30 mPa·s at 40° C. The inkjet composition may preferably have a viscosity of not more than 20 mPa·s at 60° C., more preferably of not more than 20 mPa·s at 55° C., even more preferably of not more than 20 mPa·s at 45° C. or not more than 20 mPa·s at 40° C.

The viscosity is measured on a thermally controlled rotational rheometer in cone-plate geometry (Anton Paar Physica MCR 300, cone diameter: 60 mm, zero-gap distance: 0,061 mm, cone angle: 0,5°, shear-rate 600 s$^{-1}$) at temperatures from 40 to 60° C. with a heating ramp of 2° C./min.

The inkjet composition has a stable viscosity in that the viscosity measured after 168 h does not change from the initial viscosity by more than 300% at 60° C.

The viscosity stability describes the change in viscosity of the inkjet composition over a certain period of time after mixing the ingredients in a certain environment. Usually, the viscosity of an inkjet composition for additive manufacturing changes over time due to the combination of reactive ingredients of the composition within the ink tank of the inkjet printing apparatus. The viscosity stability relates to the change in viscosity after 168 h at storage at 60° C. to the initial viscosity, i.e. the viscosity of the inkjet composition directly measured after mixing the components of the inkjet composition, i.e. 1 minute after mixing the components of the inkjet composition, and being measured at 60° C.

Preferably, the inkjet composition has a viscosity stability such that the viscosity of the inkjet composition measured after storage for 168 h at 60° C. increases by less than 300%, less than 290%, less than 280%, less than 270%, less than 260%, less than 250%, less than 240%, less than 230%, less than 220%, less than 210%, less than 200%, less than 190%, less than 180%, less than 170%, less than 160%, less than 150%, less than 140%, less than 130%, less than 120%, less than 110%, less than 100%, less than 90%, less than 80%, less than 70%, less than 60%, less than 50%, less than 40%, less than 30%, less than 20% less than 10%, or less than 5%, from an initial viscosity measured at 60° C. after mixing components of the inkjet composition.

Preferably, the inkjet composition has a viscosity stability such that the viscosity of the inkjet composition measured after storage for 168 h at 60° C. increases by less than 300%, more preferably by less than 250%, even more preferably by less than 220%, even more preferably by less than 130% from an initial viscosity measured at 60° C. after mixing components of the inkjet composition.

Preferably, the viscosity does not change over a period of 24 hours in the pressure system at the prevailing temperature, i.e. the inkjet composition has a viscosity stability in that the viscosity measured after 168 h increases from the initial viscosity by less than 5%, more preferably by less than 1%.

The viscosity stability is measured by placing the readily mixed formulation in a closed recipient (glass bottle) at a certain temperature (60° C.) in a convection oven and after a defined time (7 days=168 h) the viscosity was measured again as described in the general procedure. The comparison between the viscosity on day 7 and the initial viscosity at day 0 in % is defined as the parameter for the viscosity stability being measured at 60° C.

The inkjet composition may comprise a photoinitiator.

A photoinitiator is a molecule that generates reactive species (free radicals) when exposed to radiation (UV or visible). Photoinitiators can be any suitable photoinitiator, including Norish type I and Norish type II photoinitiator and including commonly used UV photoinitiators. The photoinitiator is a molecule that generates free radicals when exposed to radiation (UV or visible).

The photoinitiator may preferably be a UV free radical photoinitiator. Thereby, it is understood that the photoinitiator generates a reactive species, such as free radicals.

Cationic photoinitiators can promote undesirable side reactions that lead to an increase viscosity of an inkjet composition. In some forms, an inkjet composition includes no or substantially no cationic photoinitiator. In some embodiments, an inkjet composition includes less than 0.1 wt. or preferably less than 0.01 wt. of a cationic photoinitiator, based on a total weight of the inkjet composition. However, in some cases (thermal) cationic polymerization initiators are used for the thermal post curing reaction (e.g., polymerization of epoxides).

The photoinitiator can include one or more of amphor quinone; benzophenone, benzophenone derivatives, such as 2,4,6-trimethylbenzophenone, 2-methylbenzophenone, 3-methylbenzo-phenone, 4-methylbenzophenone, 2-methoxycarbonylbenzophenone 4,4'-bis(chloromethyl)-benzophenone, 4-chlorobenzophenone, 4-phenylbenzophenone, 3,3'-dimethyl-4-methoxy-benzophenone, [4-(4-methylphenylthio)phenyl]-phenylmethanone, methyl-2-benzoylbenzoate, 3-methyl-4'-phenylbenzophenone, 2,4,6-trimethyl-4'-phenylbenzophenone, 4,4'-bis(dimethylamino) benzophenone, 4,4'-bis(diethylamino)benzophenone; acetophenone, acetophenone derivatives, for example α-hydroxy-cycloalkyl phenyl ketones or α-hydroxyalkyl phenyl ketones, such as for example 2-hydroxy-2-methyl-1-phenylpropanone (DAROCETR® 1173), 1-hydroxy-cyclohexyl-phenyl-ketone (IRGACURE® 184), 1-(4-dodecylbenzoyl)-1-hydroxy-1-methyl-ethane, 1-(4-isopropylbenzoyl)-1-hydroxy-1-methyl-ethane, 1-[4-(2-hydroxyethoxy)-phenyl]-2-hydroxy-2-methyl-1-propan-1-one (IRGACURE® 2959); monoacyl phosphine oxides, e.g. (2,4,6-trimethylbenzoyl) diphenylphosphine oxide (DAROCETR® TPO), ethyl(2,4,6 trimethylbenzoyl phenyl)phosphinic acid ester; bisacylphosphine oxides, e.g., bis(2,6-dimethoxy-benzoyl)-(2,4,4-trimethyl-pentyl)phosphine oxide, bis(2,4,6-trimethylbenzoyl)-phenylphosphine oxide (IRGACURE® 819), bis(2,4,6-trimethyl-benzoyl)-2,4-dipentoxyphenylphosphine oxide, trisacylphosphine oxides, or mixtures thereof.

The photoinitiator may preferably be a phosphine oxide such as preferably diphenyl(2,4,6-trimethylbenzoyl)phosphine oxide or phenylbis(2,4,6-trimethylbenzoyl)phosphine oxide or mixtures thereof.

The photoinitiator may be comprised in the inkjet composition in an amount of 0.1 to 5 wt. %, based on the total weight of the inkjet composition. Preferably, the photoinitiator may be comprised in the inkjet composition in an amount of 0.2 to 4 wt. %, more preferably in an amount of 0.5 to 2.5 wt. %, based on the total weight of the inkjet composition.

An inkjet composition can generally comprise at least one photocurable compound and at least one thermocurable compound, wherein the at least one photocurable compound and the at least one thermocurable compound are different compounds.

Under the expression "wherein the at least one photocurable compound and the at least one thermocurable compound are different compounds" it is understood that the at least one photocurable compound and the at least one thermocurable compound are different in their chemical structure, preferably wherein the at least one photocurable compound and the at least one thermocurable compound are from different chemical structural classes. For example, the at least one photocurable compound can have an acrylic moiety. The at least one thermocurable compound can have any one or more of a cyanate ester moiety, an aliphatic polyisocyanate moiety, an aromatic polyisocyanate moiety, a polyol moiety a polyamine moiety, a blocked aliphatic polyisocyanate moiety, and an aromatic polyisocyanate moiety. The photocurable compound or thermocurable compound can include more than one of the same moiety, optionally together with different moieties. The thermocurable compound can include any one or more polyols, polyamines, and epoxy systems. The at least one photocurable compound and the at least one thermocurable compound are susceptible to different polymerization reaction mechanisms. For example, the photocurable compound can be susceptible to radical polymerization and the thermocurable compound can be susceptible to polyaddition polymerization or ionic polymerization (e.g. epoxide polymerization). In some embodiments, at least one photocurable compound can polymerize and/or crosslink in a first step by free radical (photo) polymerization and the thermocurable compound can react in a subsequent thermal post curing step (e.g. via a polyaddition or ionic polymerization).

A photocurable compound is a compound which is able to polymerize and/or crosslink when exposed to radiation (UV or visible, preferably UV) and/or which is able to polymerize and/or crosslink when exposed to a reactive species, such as radicals, generated by exposing the photoinitiator to radiation (UV or visible, preferably UV). The photocurable compound(s) can be monomers and/or pre-polymers that are polymerizable upon exposure to radiation (UV or visible, preferably UV) and/or which are able to polymerize and/or crosslink when exposed to a reactive species, such as radicals, anions or cations, preferably radicals, generated by exposing the photoinitiator to radiation (UV or visible, preferably UV).

The photocurable compound may be polymerizable and/or cross-linkable by radical polymerization. Preferably, the photocurable compound may be polymerizable and/or cross-linkable by radical polymerization.

The photocurable compound may be selected from monomers and/or prepolymers that are polymerizable upon exposure to radiation (UV or visible, preferably UV). In some forms, a photocurable compound comprises on or more of an acryloyl group, a methacryloyl group, an α-olefin group, a N-vinyl group, an acrylamide group, a methacryl amide group, a styrenic group, an epoxide group, a thiol group, a 1,3-diene group, a vinyl halide group, an acrylonitrile group, a vinyl ester group, a maleimide group, and a vinyl ether group. In some forms, a photocurable compound can include two or more of the same group. Some embodiments of an ink composition include at least one photocurable compound including one or more acryloyl groups.

The at least one photocurable compound may include any one or more of a compound containing at least one acryloyl group, a methacrylate, a styrene, an acrylic acid, a vinyl amide, a vinyl ether, a vinyl ester and mixtures thereof.

Acryloyl groups have the formula $H_2C=CH—C(=O)—$. Acryloyl groups are highly reactive and efficient groups for free radical polymerization. Generally, the at least one photocurable compound can include any number of acryloyl groups such as 1, 2, 3, 4, 5, 6, or 7, or a larger number. The inkjet composition may comprise less than 10 wt. %, less than 8 wt. %, less than 6 wt. %, less than 4 wt. %, less than 2 wt. %, less than 1 wt. %, less than 0.5 wt. %, less than 0.1 wt. %, or less than 0.05 wt. % of radically photopolymerizable monomers not including at least one acryloyl group, based on the total weight of the inkjet composition.

Methacryloyl groups have the formula $H_2C=C(CH_3)—C(=O)—$. Acryloyl groups are generally more reactive than methacryloyl groups during radical photopolymerization. Methacryloyl groups alone in some embodiments may provide insufficient reactivity during photopolymerization. In some forms, an inkjet composition includes at least one photocurable compound having one or more acryloyl groups and no or substantially no photocurable compounds including methacryloyl groups. In some embodiments, an inkjet composition includes less than 10 wt. %, less than 8 wt. %, less than 6 wt. %, less than 4 wt. %, less than 2 wt. %, less than 1 wt. %, less than 0.5 wt. %, less than 0.1 wt. %, or less than 0.05 wt. % of radically photopolymerizable monomers including one or more methacryloyl groups, based on the total weight of the inkjet composition.

The total amount of acryloyl groups in an inkjet composition may be in any suitable amount and may range from 0.2 to 5.8 mol/kg, 0.4 to 5.6 mol/kg, 0.6 to 5.4 mol/kg, 0.8 to 5.2 mol/kg, 0.9 to 5.1 mol/kg, 1.0 to 5.0 mol/kg, 1.1 to 4.9 mol/kg, 1.2 to 4.8 mol/kg, 1.4 to 4.6 mol/kg, 1.6 to 4.4 mol/kg, 1.8 to 4.2 mol/kg, 2.0 to 4.0 mol/kg, 2.2 to 3.8 mol/kg, 2.4 to 3.6 mol/kg, 2.6 to 3.4 mol/kg, or 2.8 to 3.2 mol/kg.

The molar ratio of acryloyl groups to thermal curable groups in the inkjet composition may be any suitable value and may ranges from 0.05 to 3.25, 0.1 to 3.2, 0.15 to 3.15, 0.2 to 3.1, 0.25 to 3.05, 0.30 to 3.0, 0.35 to 2.95, 0.4 to 2.9, 0.45 to 2.85, 0.5 to 2.8, 0.55 to 2.75, 0.6 to 2.7, 0.65 to 2.65, 0.7 to 2.6, 0.75 to 2.55, 0.8 to 2.5, 0.85 to 2.45, 0.9 to 2.4, 0.95 to 2.35, 1.0 to 2.3, 1.05 to 2.25, 1.1 to 2.2, 1.15 to 2.15, 1.2 to 2.1, 1.25 to 2.05, 1.3 to 2.0, 1.35 to 1.95, 1.4 to 1.90, or 1.45 to 1.85.

An inkjet composition including both a total amount of acryloyl groups and a molar ratio of acryloyl groups to thermal curable groups, as described above, can provide a final product having desirable and improved mechanical properties. In addition, the amount of thermal curable groups in an inkjet composition can greatly influence the properties of a final product prepared from the composition.

Preferably the photocurable compound may be selected from isobornyl methacrylate, dihydrodipentadienyl acrylate (CAS: 12542-30-2), vinyl methyl oxazolidinone (CAS: 3395-98-0), cyclic trimethylolpropane formal acrylate (CAS: 66492-51-1), tricyclodecanemethanol acrylate, 2-phenylethyl acrylate, 2-hydroxy-3-phenoxypropylacrylat (CAS: 16969-10-1), 2-[(butylcarbamoyl)oxy]ethyl acrylate (63225-53-6), 4-hydroxybutyl acrylate (2478-10-6), acrylonitrile, styrene, divinyl benzene, vinyl toluene, methyl acrylate, ethyl acrylate, butyl acrylate, isobornylacrylate, acryloyl morpholine, methyl(meth) acrylate, amine(meth) acrylates and mixtures thereof.

The photocurable compound may include one or of isobornylacrylate, acryloyl morpholine, and 2-[(butylcarbamoyl)oxy]ethyl acrylate and mixtures thereof.

The photocurable compound(s) may be comprised in the inkjet composition in an amount of 15 to 80 wt. %, based on the total weight of the inkjet composition. Preferably, the photocurable compound(s) may be comprised in the inkjet composition in an amount of 20 to 50 wt. %, more preferably in an amount of 25 to 30 wt. %, based on the total weight of the inkjet composition.

The photocurable compound(s) and photoinitiator may be comprised in the inkjet composition in a weight ratio of 90:10 to 99.95:0.05, more preferably 95:5 to 99.5:0.5 and even more preferably 97:3 to 99:1, most preferably 98:2.

A thermocurable compound is a compound that can be polymerized and/or crosslinked when exposed to heat. Preferably, the thermal curable compound can be polymerized and/or cross-linked when exposed to temperatures of between 80° C. to 250° C., preferably between 100° C. to 220° C., preferably between 120° C. to 200° C.

Thermocurable compounds capable of thermally reacting at temperatures below 100° C. may cause an undesirable increase in viscosity of an inkjet composition during storage. In some forms, an inkjet composition includes no compounds or substantially no compounds that thermally react at temperatures below 100° C., for example by one or more of polyaddition or polycondensation.

The thermocurable compound may be polymerizable and/or cross-linkable by polyaddition or by thermal ionic polymerization reactions.

The at least one thermocurable compound can generally include one or more thermal curable groups, which may be the same or different. For example, at least one thermocurable compound can comprise any one or more of a cyanate ester group, an epoxy group, and an isocyanate group, a maleimide group, an anhydride group, etc. For example, the at least one thermocurable compound, any one or more of epoxy systems, such as epoxy compounds (and, optionally, polyamines and/or polyols), cyanate esters, bismaleimides, anhydrides, aliphatic or aromatic polyisocyanates, preferably diisocyanates, (and, optionally, polyamines and/or polyols), blocked aliphatic or aromatic polyisocyanates, preferably diisocyanates (and, optionally, polyamines and/or polyols), phenol-formaldehydes, melamine resins, furans, and silicones, or mixtures thereof. The thermocurable compound may preferably include one or more of an epoxy system, such as epoxy compounds (and, optionally, polyamines and/or polyols), cyanate esters, aliphatic or aromatic polyisocyanates, preferably diisocyanates (and, optionally, polyamines and/or polyols), blocked aliphatic or aromatic polyisocyanates, preferably diisocyanates (and, optionally, polyamines and/or polyols) or mixtures thereof.

The term epoxy system is well known by a skilled person in the technical field. The epoxy system may preferably comprise at least one epoxy compound (and optionally at least one polyamine and/or polyol). The at least one epoxy compound may preferably comprise any one or more of 3,4-epoxycyclohexylmethyl, 3, 4-epoxycyclohexanecarboxylate, diglycidyl ether of bisphenol A, trimethylol propane triglycidyl ether, PPG 400 diglycidyl ether, limonene dioxide, (3,4-epoxycyclohexyl)methyl methacrylate, 2-ethylhexyl glycidyl ether. The optional at least one polyamine may preferably comprise any one or more of diphenylmethan-4,4'-diamine, isophorondiamine, 2,4-diaminotoluol, m-xylylenediamine, 1,6-hexamethylendiamine, 1,12-dodekamethylendiamin, 2,2,2-(2,4,4-trimethylen-1,6-hexamethylendiamin, 4,7,10-trioxa-1,13-tridekandiamin, one or more fatty acid-derived diamines, such as Priamine 1075, one or more polyetheramines, such as Jeffamine D230, Jeffamine D205, Jeffamine D400, Jeffamine D2000, Jeffamine SD2001, Jeffamine ED600, Jeffamine ED900, Jeffamine ED2003, Jeffamine T403, Jeffamine T3000, Jeffamine THF100 and Jeffamine THF170 (wherein Jeffamine indicates the tradename of the polyamines, D indicates a diamine based on a polypropylene glycol backbone, ED indicates polyetherdiamines predominantly on a polyethylene glycol backbone, T indicates triamines based on a trifunctional PPG backbone, THF indicates diamines or triamines based on either a [poly(tetramethylene ether glycol)]/polypropylene glycol copolymer and the number indicates the approximate molecular weight) or any mixture thereof. The optional at least one polyol may preferably comprise any one or more of 1,3-propandiol, 1,4-butandiol, 1,6-hexandiol, hydroquinone, trimethylolpropane, glycerin, 2-phenylalcohol, one or more polypropylene glycols, such as PPG400 and PPG1000, one or more polyethylenes, such as PEG400, PEG600, PEG1000, and one or more polyTHFs, such as PolyTHF250 and PolyTHF1000 or any mixture thereof.

The term cyanate ester is well known by a skilled person in the technical field. Useful cyanate esters include a polycyanate ester, an aromatic diisocyanate ester, and an aliphatic diisocyanate ester, preferably an aromatic diisocyanate ester. A cyanate ester may preferably comprise a bisphenol E based cyanate ester (AroCy® L-10), a novolac-based cyanate ester (AroCy® XU 371), a bisphenol M based cyanate ester (AroCy® XU 366 and AroCy® XU 378). The cyanate ester may more preferably be a bisphenol E based cyanate ester (AroCy® L-10) or a novolac-based cyanate ester (AroCy® XU 371).

The term aliphatic or aromatic polyisocyanates is well known by a skilled person in the technical field. The aliphatic or aromatic polyisocyanates may comprise an aliphatic or aromatic diisocyanate (and, optionally, polyamines and/or polyols). For the sake of clarity, the aliphatic or aromatic polyisocyanates can be used in free or blocked form (vide infra for the understanding of polyisocyanates in blocked form).

Some useful aliphatic and aromatic polyisocyanates comprise one or more of toluylendiisocyanate, such as 2,4-toluylendiisocyanate and 4,4-toluylendiisocyanate, diphenylmethandiisocyanates, such as 4,4-diphenylmethandiisocayante, isophorondiisocyanate, dicyclohexylmethanediisocyanate, such as dicyclohexlmethan-4,4-diisocyanate, hexamethylendiisocyanate, such as hexamethylene-1,6-diisocyanate, and cyclohexyldiisocyanate, such as 1,4-cyclohexyldiisocyanate. Preferred are aromatic polyiisocyanates include one or more of a toluylendiisocyanates, such as 2,4-toluylendiisocyanate and 4,4-toluylendiisocyanate, and diphenylmethandiisocyanates, such as 4,4-diphenylmethandiisocayante. The optional polyamines may preferably comprise one or more of diphenylmethan-4,4'-diamine, isophorondiamine, 2,4-diaminotoluol, m-xylylenediamine, 1,6-hexamethylendiamine, 1,12-dodekamethylendiamin, 2,2,2-(2,4,4-trimethylen-1,6-hexamethylendiamin, 4,7,10-trioxa-1,13-tridekandiamine, fatty acid-derived diamines, such as Priamine 1075, polyetheramines, such as Jeffamine D230, Jeffamine D205, Jeffamine D400, Jeffamine D2000, Jeffamine SD2001, Jeffamine ED600, Jeffamine ED900, Jeffamine ED2003, Jeffamine T403, Jeffamine T3000, Jeffamine THF100 and Jeffamine THF170 (wherein Jeffamine indicates the tradename of the polyamines, D indicates a diamine based on a polypropylene glycol backbone, ED indicates polyetherdiamines predominantly on a polyethylene glycol backbone, T indicates triamines based on a trifunctional PPG backbone, THF indicates diamines or triamines based on either a [poly(tetramethylene ether glycol)]/polypropylene glycol copolymer and the number indicates the approximate molecular weight) or any mixture thereof. The optional polyols may preferably comprise 1,3-propandiol, 1,4-butandiol, 1,6-hexandiol, hydroquinone, trimethylolpropane, glycerin, 2-phenylalcohol, polypropylenglycols, such as PPG400 and PPG1000, polyethylenes, such as PEG400, PEG600, PEG1000, polyTHFs, such as PolyTHF250 and PolyTHF1000 or any mixture thereof.

The thermocurable compound(s) may be comprised in the inkjet composition in an amount of 20 to 85 wt. %, based on the total weight of the inkjet composition. Preferably, the thermocurable compound(s) may be comprised in the inkjet composition in an amount of 50 to 70 wt. %, more preferably in an amount of 70 to 75 wt. %, based on the total weight of the inkjet composition.

The thermocurable compound(s) and photocurable compound(s) may be comprised in the inkjet composition in a weight ratio (or molar ratio) of 20:80 to 85:1, preferably 50:50 to 80:20, more preferably 70:30.

The inkjet composition may also comprise one or more multifunctional photocurable crosslinkers.

The multifunctional photocurable crosslinker is understood as comprising two or more reactive functional groups that can be polymerized and/or crosslinked when exposed to radiation (UV or visible, preferably UV) and/or that can be polymerized and/or crosslinked when exposed to a reactive species, such as radicals, anions or cations, preferably radicals, generated by exposing the photoinitiator to radiation (UV or visible, preferably UV).

The multifunctional photocurable crosslinker may be polymerizable and/or cross-linkable by anionic, cationic or radical polymerization. Preferably, the multifunctional photocurable crosslinker is polymerizable and/or cross-linkable by radical polymerization.

The multifunctional photocurable crosslinker may be selected from monomers and/or prepolymers that have two or more reactive functional groups which are polymerizable upon exposure to radiation and, preferably, may comprise two or more of an acrylate group, a methacrylate group, an α-olefin group, a N-vinyl group, an acrylamide group, a methacryl amide group, a styrenic group, an epoxide group, a thiol group, a 1,3-diene group, a vinyl halide group, an acrylonitrile group, a vinyl ester group, a maleimide group, and a vinyl ether group, as reactive functional groups.

The multifunctional photocurable crosslinker may preferably include a bifunctional and/or trifunctional crosslinker and/or multi-functional crosslinker, such as a 4, 5 or 6 functional crosslinker. Preferably, the multifunctional photocurable crosslinker may be a trifunctional crosslinker.

The multifunctional photocurable cross-linkers may preferably include one or more of trimethylolpropantriacrylate, or tricyclodecane dimethanol diacrylate (CAS: 42594-17-2), tricyclodecanedimethanol dimethacrylate (CAS: 42594-17-2), polyethylene glycol diacrylate (CAS: 25322-68-3), polypropylene glycol diacrylate (CAS: 52496-08-9), poly(propylene glycol) dimethacrylate (CAS: 25852-47-5), poly(ethylene glycol) dimethacrylate (CAS: 25852-49-7), dipropylene glycol diacrylate (CAS: 57472-68-1), trimethylolpropane trimethacrylate (3290-92-4), bisphenol A glycerolate dimethacrylate acrylate (CAS: 1565-94-2), bisphenol A glycerolate diacrylate (CAS: 4687-94-9), diurethane dimethacrylate (CAS: 72869-86-4), bisphenol A ethoxylate dimethacrylate (CAS: 41637-38-1), aliphatic urethane (CAS: 72162-39-1), tris isocyanurate triacrylate (CAS: 40220-08-4), bisphenol A epoxy diacrylate (CAS: 55818-57-0), trimethylolpropane tetraacrylate (CAS: 94108-97-1), 7,7,9(or 7,9,9)-trimethyl-4,13-dioxo-3,14-dioxa-5,12-diazahexadecane-1,16-diyl bismethacrylate (CAS: 72869-86-4).

The multifunctional photocurable cross-linker may be comprised in the inkjet composition in an amount of 2 to 50 wt. %, based on the total weight of the inkjet composition. Preferably, the multifunctional photocurable compound(s) may be comprised in the inkjet composition in an amount of 5 to 25 wt. %, more preferably in an amount of 7.5 to 10 wt. %, based on the total weight of the inkjet composition.

The inkjet composition may further comprise one or more metal catalysts.

A metal catalyst may catalyze any polymerization and/or crosslinking, such as the anionic, cationic or radical polymerization and/or polyaddition, in any one of the curing steps, such as the photocuring and/or thermocuring step, according to a method of manufacturing a three-dimensional object. Preferably, the metal catalyst may catalyze the polyaddition of the thermocuring step according to the method of manufacturing.

The metal catalyst may include one or of a chelate or oxide of one or more of divalent copper, zinc, manganese, tin, lead, cobalt and nickel, trivalent iron, cobalt, manganese, aluminum, and tetravalent titanium. The metal catalyst may be a metal salt of an organic acid of one or more of aluminum, copper, zinc, lead, nickel, iron, tin and cobalt.

The metal catalyst may preferably be a chelated metal catalyst. The metal catalyst may preferably be a chelated aluminum catalyst. The metal catalyst may more preferably be aluminum acetyl acetonate.

The metal catalyst may be comprised in the inkjet composition in an amount of 100 to 3000 ppm, based on the total weight of the cyanate ester in the inkjet composition. Preferably, the metal catalyst may be comprised in the inkjet composition in an amount of 300 to 2000 ppm, based on the total weight of the cyanate ester in the inkjet composition, more preferably in an amount of 700 to 1500 ppm, based on the total weight of the cyanate ester in the inkjet composition.

The thermocurable compound(s) and one or more metal catalysts may be comprised in the inkjet composition in a weight ratio (or molar ratio) of 5000:1 to 50:1.

In case the at least one thermocurable compound comprises a cyanate ester, the inkjet composition preferably comprises at least one metal catalyst as described hereinabove.

The inkjet composition may further comprise one or more latent curing agents.

The term latent curing agent is well known by a skilled person in the technical field. A latent curing generally does not react with the thermocurable compound, preferably epoxy compounds, at room temperature, but reacts upon heating with the thermocurable compound, preferably epoxy compounds, to effect curing.

In case the at least one thermocurable compound comprises an epoxy system, the inkjet composition preferably comprises at least one latent curing agent as described herein-below.

Some useful latent curing agents include super acids, such as trifluormethanesulfonic acid, fluorosurfuric acid, paratuoluensoflonic acid, triflurooantimonate sulfonic acid, hexafluoroantimonate, tetrakis(pentafluorophenyl)borate, etc. A super acid is an acid with an acidity greater than that of 100% pure sulfuric acid, which has a Hammett acidity function $(H_0)$ of −12. The latent curing agent may comprise one or more of trifluoromethanesulfonic acid, preferably blocked trifluoromethanesulfonic acid, more preferably a quaternary ammonium blocked trifluoromethansulfonic acid (for example K-PURE® TAG-2689 or K-PURE® CXC-1614). These species work as thermal ionic initiators or as thermal catalysts.

The latent curing agent may be comprised in the inkjet composition in an amount of 0.1 to 2 wt. %, preferably 0.5 to 1.5 wt. %, based on the total amount of the inkjet composition.

The inkjet composition may further comprise the at least one thermocurable compound in a blocked form.

In case the at least one thermocurable compound comprises aliphatic or aromatic polyisocyanates (and, optionally, polyols and/or polyamines), the inkjet composition preferably comprises the aliphatic or aromatic polyisocyanates in blocked form.

Blocking of the thermocurable compound, preferably aliphatic or aromatic polyisocyanates, results in a latent reactive functional group which can be released after deblocking of the blocking agent to further react with additional reactive functional groups. Thereby, a blocking agent is reacted with the thermocurable compound, preferably aliphatic or aromatic polyisocyanates, to covalently bind the blocking agent to the reactive groups of the thermocurable compound, preferably the isocyanate groups of the aliphatic or aromatic polyisocyanate. Deblocking of the thermocurable compound, preferably isocyanates, can be achieved by for example heating the thermocurable compound in a blocked form or blocked thermocurable compound, preferably blocked aliphatic or aromatic polyisocyanate, respectively.

Some useful blocking agents include any one or more of caprolactam, preferably ε-caprolactam, methyl ketone oxime, imidazole, 3,5-dimethylpyrazole and diisopropylamine. The blocking agent may preferably be selected from ε-caprolactam, methyl ketone oxime, imidazole or 3,5-dimethylpyrazole, even more preferably from ε-caprolactam.

The blocking agent is present in an amount so that the reactive groups of the thermocurable compound are blocked to an extent of at least 80%, preferably at least 90%, more preferably at least 99%, more preferably at least 99.7%, even more preferably at least 99.85%, most preferably 100% of the reactive functional groups of the thermocurable compound, preferably isocyanates.

The inkjet composition may further comprise one or more stabilizers.

In some forms, stabilizers may comprise glycerol propoxylate (1PO/OH) triacrylate and/or 4-methoxyphenol and preferably a combination of glycerol propoxylate (1PO/OH) and 4-methoxyphenol (also known as Genorad 18).

One or more stabilizers may be comprised in the inkjet composition in an amount of 0.05 to 3 wt. %, based on the total weight of the inkjet composition. Preferably, one or more stabilizers may be comprised in the inkjet composition in an amount of 0.1 to 1.8 wt. %, more preferably in an amount of 0.5 to 1.3 wt. %, based on the total weight of the inkjet composition.

The inkjet composition may further comprise any one or more of a defoaming agent, dye, pigment, a dispersant, a diluent, an active compound, a pharmaceutical compound, a detectable compound, etc. A skilled person is able to choose one or more of the before mentioned additional agents or additives for modifying the inkjet composition according to specific needs.

The addition of further ingredients is possible but in many cases not advantageous (e.g. if there is no contribution concerning a curing effect or if non-desired thermal reactivity below 100° C. is caused): Generally, it is not preferred to use (higher amounts of) inert solvents (not able to photopolymerize in the first step or to post cure in the second step). An inkjet composition can optionally include one or more inert solvents that are generally non-reactive during photopolymerization and thermal curing, but use of such inert solvents can also be avoided. The inkjet composition may include less than 10 wt. less than 8 wt. less than 6 wt. less than 4 wt. less than 2 wt. less than 1 wt. or less 0.5 wt. % of inert solvent based on the total weight of the inkjet composition. In some embodiments, an inkjet composition includes no or substantially no inert solvents.

The inkjet composition may have a green body strength after being photo-cured and before being thermo-cured of having an index of A or B.

The green body strength describes the stability of the object after photo-curing and before thermo-curing. The green body strength is a measure on the stability and crosslinking of the photo-cured object.

Preferably, the inkjet composition has a green body strength after being photo-cured and before being thermo-cured of A.

The green body strength is measured by creating a rectangular specimen with a dimension of 40 mm×7 mm×4 mm (b×a×c) of the respective formulation by UV-irradiation. This specimen was placed on two Teflon blocks with a volume of 100 mm×5 mm×5 mm. The span width was 35 mm. The set-up was kept at room temperature and after 10 h the bending/deformation was checked. To quantify different formulations, a grading system (see FIG. 1) was defined: A) means no (i.e. 0% bending) or almost no bending in the range of not more than 5%, not more than 3%, not more than 1% from the initial rectangular specimen was observed after 30 minutes. The percentage in bending is defined in comparing the center position (dimension 20 mm×3.5 mm×2 mm (b×a×c)) of the rectangular specimen at the beginning of the set-up at time 0 and the center position of the rectangular specimen at the end of the set-up at time 10. B) means that the bending becomes more pronounced so that the specimen shows bending of more than 5% to almost touching the ground. C) indicates that the specimen touches ground. The same was done after curing in the above-mentioned oven-cure program. For all examples given in this context, an observable deformation occurred only after UV-curing at room temperature.

The inkjet composition may be filtered before using it as an inkjet composition. Preferably, the inkjet composition is filtered in a manner so that it does not comprise particles having a particle size of more than 2 µm, more preferably having a particle size of not more than 1 µm.

In a preferred embodiment, the inkjet composition has a viscosity stability in that the viscosity measured for 168 h does not change from the initial viscosity by more than 300% at 60° C. and comprising at least one photocurable compound, at least one thermocurable compound and a photoinitiator, wherein the at least one thermocurable compound is a cyanate ester.

For the embodiment comprising a cyanate ester, the same definitions and embodiments as described herein-above in general apply mutatis mutandis.

In a preferred embodiment, the inkjet composition has a viscosity stability in that the viscosity measured for 168 h does not change from the initial viscosity by more than 300% at 60° C. and comprising at least one photocurable compound, at least one thermocurable compound and a photoinitiator, wherein the at least one thermocurable compound is an aliphatic or aromatic polyisocyanate, preferably diisocyanates (and, optionally, polyamines and/or polyols) or blocked aliphatic or aromatic polyisocyanate, preferably diisocyanates (and, optionally, polyamines and/or polyols).

For embodiments comprising an aliphatic or aromatic polyisocyanate, preferably diisocyanates, (and, optionally, polyamines and/or polyols) or blocked aliphatic or aromatic polyisocyanate, preferably diisocyanates (and, optionally, polyamines and/or polyols), the same definitions and embodiments as described herein-above in general apply mutatis mutandis.

In a preferred embodiment, the inkjet composition has a viscosity stability in that the viscosity measured for 168 h does not change from the initial viscosity by more than 300% at 60° C. and comprising at least one photocurable compound, at least one thermocurable compound and a photoinitiator, wherein the at least one thermocurable compound is an epoxy system.

For the embodiment comprising an epoxy system, the same definitions and embodiments as described herein-above in general apply mutatis mutandis.

In another aspect, an inkjet composition for additive manufacturing comprises at least one photocurable compound, at least one thermocurable compound and a photoinitiator, wherein the at least one photocurable compound and the at least one thermocurable compound are different compounds.

For this aspect of the present invention, the definitions and embodiments as described herein-above in general apply mutatis mutandis.

Also provided is a kit-in-parts inkjet composition comprising at least one photocurable compound, at least one thermocurable compound and a photoinitiator, wherein the at least one photocurable compound and the at least one thermocurable compound are different compounds.

For this aspect of the present invention, the definitions and embodiments as described herein-above in general apply mutatis mutandis.

The kit-in-parts inkjet composition may comprise a combination of at least one photocurable compound and at least one thermocurable compound and a separate photoinitiator. The kit-in-parts inkjet composition may comprise a combination of at least one photocurable compound, at least one thermocurable compound and a photoinitiator and a separate metal catalyst.

Further provided is a method of manufacturing a three-dimensional object by using an inkjet composition as described herein-above.

Generally, a method of manufacturing a three-dimensional object with an inkjet composition comprises dispensing the inkjet composition, irradiating (e.g., photo-curing) the dispensed inkjet composition, and thermo-processing (e.g., thermo-curing) the irradiated inkjet composition. In some forms, dispensing the inkjet composition and then irradiating the dispensed inkjet composition can be repeated any suitable number of iterations before conducting any thermo-processing. The method may optionally further comprise dispensing support ink, curing the support ink, and removing any cured or uncured support ink.

In some forms, the method may comprise the following step(s):
a. dispensing the inkjet composition as described hereinabove using an inkjet dispenser apparatus for additive manufacturing on a substrate to form a layer in a configured pattern corresponding to the shape of the object;
b. irradiating the formed layer to form a photo-cured layer;
c. optionally, sequentially repeating steps a. and b. to form a plurality of photo-cured layers;
d. heating the photo-cured layer(s) to form the three-dimensional object.

The method may comprise a step of dispensing the inkjet composition as described hereinabove using an inkjet printer for additive manufacturing on a substrate to form a layer in a configured pattern corresponding to the shape of the object.

Thereby, it is understood that the dispensing means, e.g. the nozzle of the printing head, of the inkjet dispenser apparatus, e.g. the inkjet printing apparatus, dispense the inkjet composition as described hereinabove in a layer or different layers in a configured pattern on a substrate. An inkjet composition may generally be dispensed on any substrate. The pattern of the layer(s) is configured in the shape of the object, i.e. of the photo-cured and thermo-cured final object.

Before, during or after the step of dispending the inkjet composition as described hereinabove, a step of dispensing a support ink can take place. The support ink may act in a cured or semi-cured state as a support for the inkjet composition to allow the provision of certain geometries of the three-dimensional object. Standard support ink composition can be used for this step.

The method may comprise a further step of irradiating the formed layer to form a photo-cured layer.

Thereby, it is understood that formed layer of the inkjet composition is irradiated with UV or visible light in order to initiate a polymerization and/or crosslinking reaction of the photocurable compound(s) to form a photo-cured layer. Preferably, the irradiation with UV or visible light initiates an anionic, cationic or radical polymerization and/or crosslinking reaction, preferably radical polymerization and/or crosslinking reaction, of the photocurable compound(s) to form a photo-cured layer.

The photo-cured layer may then be the substrate of a further step of dispensing the inkjet composition as described hereinabove using the inkjet dispenser apparatus for additive manufacturing on a substrate to form a layer in a configured pattern corresponding to the shape of the object.

The steps of dispensing and photocuring as described hereinabove may be repeatedly applied in order to form a plurality of photo-cured layers. Thereby, a green-body is formed which has been photo-cured but not yet thermo-cured. The green body has the properties as described hereinabove.

The method may comprise a further step of heating the photo-cured layer(s) to form the three-dimensional object. The three-dimensional object has the properties as described hereinbelow.

The method may also comprise a step of removing the support ink or cured support ink.

Also provided is a three-dimensional object manufactured according to the method as described herein-above.

The method of manufacturing a three-dimensional object as described hereinabove provides particularly unique and beneficial three-dimensional objects.

The three dimensional object may have a tensile strength of 1-20 MPa, more preferably 21-40 MPa, more preferably 41-60 MPa, more preferably 61-80 MPa and even more preferably 81-100 MPa.

The three dimensional object may have an elongation at break of 1-2%, more preferably 2.1-5%, even more preferably 5.1-10% and even more preferably more than 10%.

The three dimensional object may have an E-modulus of 10-100 MPa, more preferably 101-1000 MPa, even more 1001-2000 MPa, even more preferably 2001-3000 MPa, even more preferably 3001-4500 MPa.

Tensile testing was performed on a Zwick-Roell tensile tester 1445 following the DIN EN ISO norm 527-1 with 5A specimen. E-Modul was determined from the slope of the stress-strain curve at deformations from 0.05-0.25% at 1 mm/min. Tensile strength and elongation at break were determined by pulling the specimen at 5 mm/min for rigid materials and at 50 mm/min for elastic samples.

Also provided is a use of an inkjet composition as described herein-above for manufacturing a three-dimensional object.

EXAMPLES

General Terms and Definitions

Reactants as Used in the Examples
Isobornylacrylate—CAS No 5888-33-5 from SARTOMER
Acryloyl morpholine—CAS No 5117-12-4 from RAHN
Trimethylolpropane triacrylate—CAS No 15625-89-5 from SARTOMER
BHT—CAS No 128-37-0 from Sigma Aldrich
Omnirad 819—photoinitiator with CAS No 162881-26-7 from IGM Resins
Genorad 16—polymerization inhibitor being a combination of glycerol propoxylate (1PO/OH) and 4-methoxyphenol from RAHN
AroCy 10—bisphenol-E based cyanate ester with CAS No 47073-92-7 from HUNTSMAN
$Al(acac)_3$—CAS No 13963-57-0 from Sigma Aldrich
$Co(acac)_3$ from Sigma Aldrich
BYK 333—polyether modified polydimethylsiloxane additive from Byk
DESMSODUR N3400—hexamethylendiisocyanate with CAS No. 28182-81-2 from Covestro
ε-Caprolactam—CAS No. 105-60-2 from Sigma-Aldrich
K-KAT® XK-651—bismuth carboxylate catalyst from King Industries
K-PURE® CXC1612—latent curing agent from King Industries
K-PURE® CXC2689—latent curing agent from King Industries General Methods for Measuring
Viscosity is measured on a thermally controlled rotational rheometer in cone-plate geometry (Anton Paar Physica MCR 300, cone diameter: 60 mm, zero-gap distance: 0,061 mm, cone angle: 0,5°, shear-rate 600 $s^{-1}$) at temperatures from 40 to 60° C. with a heating ramp of 2° C./min.

The viscosity stability is measured by placing the readily mixed formulation in a closed recipient (glass bottle) at a certain temperature (60° C.) in a convection oven and after a defined time (7 days) the viscosity was measured again as described in the general procedure. The comparison to the initial viscosity at day 0 was defined as a parameter for the viscosity stability.

The green body strength is measured by creating a rectangular specimen with a dimension of 40 mm×7 mm×4 mm (b×a×c) of the respective formulation by UV-irradiation. This specimen was placed on two Teflon blocks with a volume of 100 mm×5 mm×5 mm. The span width was 35 mm. The set-up was kept at room temperature and after 10 h the bending/deformation was checked. To quantify different formulations, a grading system (see FIG. 1) was defined: A) means no (i.e. 0% bending) or almost no bending in the range of not more than 5%, not more than 3%, not more than 1% from the initial rectangular specimen was observed after 30 minutes. The percentage in bending is defined in comparing the center position (dimension 20 mm×3.5 mm×2 mm (b×a×c)) of the rectangular specimen at the beginning of the set-up at time 0 and the center position of the rectangular specimen at the end of the set-up at time 10. B) means that the bending becomes more pronounced so that the specimen shows bending of more than 5% to almost touching the ground. C) indicates that the specimen touches ground. The same was done after curing in the above-mentioned oven-cure program. For all examples given in this context, an observable deformation occurred only after UV-curing at room temperature.

Tensile testing was performed on a Zwick-Roell tensile tester 1445 following the DIN EN ISO norm 527-1 with 5 A specimen. E-Modul was determined from the slope of the stress-strain curve at deformations from 0.05-0.25% at 1 mm/min. Tensile strength and elongation at break were determined by pulling the specimen at 5 mm/min for rigid materials and at 50 mm/min for elastic samples.

Post Curing Type A Examples (Cyanate Ester Thermal Curing):

Example A-1

Isobornlyacrylate (25 wt %), acryloyl morpholine (ACMO) (12.5 wt %), trimethylpropane triacrylate (TMPTA) (12.5 wt %), butylhydroxytoluol (0.3 wt %), Omnirad 819 (1 wt %), Genorad 16 (0.5 wt %) AroCy 10 US bisphenol-E based cyanate ester (48.2 wt %) and additional 500 ppm Al(acac)$_3$ were mixed and filtered over 1 μm.

| Example A-1 Compound | Wt % in formulation | Mol of functionality (for 1 kg final formulation) | % of all UV-curing functionalities | % of all curing functionalities |
|---|---|---|---|---|
| IBOA | 25 | 1.20 | 36% | 17% |
| ACMO | 12.5 | 0.88 | 26% | 13% |
| TMPTA | 12.5 | 1.26 | 38% | 18% |
| AroCy 10 L | 48.2 | 3.64 | | 52% |
| CN 981 | — | | | |

The ink was inkjet UV printed and post-cured from RT to 220° C. with a heating ramp of 1K/min.

The final properties of the final object were:

Tensile strength: 75 MPa,

Elongation at break: 2.5%

E-Modulus: 3200 MPa.

Green Body Measurement:

| Example A-1 | |
|---|---|
| Length [mm] | Thickness [mm] |
| UV-curing | |
| 40 | 4 A |
| UV-curing + Thermal curing | |
| 40 | A |

Example A-2

Isobornlyacrylate (12.5 wt %), acryloyl morpholine (7.5%), trimethylolpropane triacrylate (7.5%), BHT (0.3 wt %), Omnirad 819 (1 wt %), Genorad 16 (0.5 wt %) AroCy 10 US bisphenol-E based cyanate ester (68.2 wt %) and additional 1500 ppm Al(acac)$_3$ were mixed and filtered over 1 μm.

| Example A-2 Compound | Wt % in formulation | Mol of functionality (for 1 kg final formulation) | % of all UV-curing functionalities | % of all curing functionalities |
|---|---|---|---|---|
| IBOA | 12.5 | 0.60 | 32% | 8.5% |
| ACMO | 7.5 | 0.53 | 28% | 7.5% |
| TMPTA | 7.5 | 0.75 | 40% | 10.8% |
| AroCy 10 L | 68.2 | 5.16 | | 73.2% |
| CN 981 | — | | | |

The ink was inkjet UV printed and post-cured from RT to 220° C. with a heating ramp of 1K/min.

The final properties of the final object were:

Tensile strength: 80 MPa,

Elongation at break: 2.7%,

E-Modulus: 2900 MPa.

The viscosity stability of Example A-2 is measured to be as following:

| Formulation | Time [days] at 60° C. | Viscosity at 60° C. [mPa · s] |
|---|---|---|
| Example A-2 | 0 | 9 |
| | 7 | 11 |

[1]Viscosity measured as described in the general procedure.

Green Body Measurement:

| Example A-2 | |
|---|---|
| Length [mm] | Thickness [mm] |
| UV-curing | |
| 40 | 4 A |
| UV-curing + Thermal curing | |
| 40 | A |

Example A-3

For an inkjet composition according to Example A-2, the viscosity was measured after storage at 60° C. at different time intervals in the presence of different catalysts and concentrations (see table below).

|  | Formulation | | | |
| --- | --- | --- | --- | --- |
|  | 1 | 2 | 3 | 4 |
| Catalyst | Al(acac)$_3$ | | Co(acac)$_3$ | |
| Ppm | 700 | 1500 | 700 | 1500 |
| Time of storage at 60° C. [days] | $^1$Viscosity [mPa · s] at 60° C. after storage at 60° C. | | | |
| 0 | 12.3 | 13.8 | 14.0 | 13.9 |
| 2 | 15.7 | 17.9 | 14.6 | 17.8 |
| 5 | 20.8 | 25.4 | 20.1 | 67.4 |
| 7 | 24.7 | 32.4 | 32.0 | 429 |
| Viscosity Increase in % | 201 | 235 | 229 | 3086 |

$^1$Viscosity measured as described in general procedure. Storage at 60° C. in convection oven.

The viscosity increase in the presence of the cobalt-catalyst is more pronounced than for the aluminum catalyst.

Example A-4

Isobornlyacrylate (20.8 wt %), acryloyl morpholine (10.3 wt %), Trimethylolpropane triacrylate (10.3 wt %), Omnirad 819 (2 wt %), Genorad 16 (0.25 wt %) AroCy 10 US bisphenol-E based cyanate ester (50 wt %), Aluminum acetylacetonate (0.03 wt %) and CN 981 (an aliphatic polyester/polyether based urethane diacrylate oligomer) (6.32 wt %) were mixed and filtered over 1 μm. The ink was ink-jet UV printed and post-cured from RT to 220° C. with a heating ramp of 1K/min.

| Example A-4 Compound | Wt % in formulation | Mol of functionality (for 1 kg final formulation) | % of all UV-curing functionalities | % of all curing functionalities |
| --- | --- | --- | --- | --- |
| IBOA | 20.8 | 0.99 | 29% | 14% |
| ACMO | 10.3 | 0.72 | 21% | 10% |
| TMPTA | 10.3 | 1.04 | 30% | 14% |
| AroCy 10 L | 50 | 3.78 |  | 52% |
| CN 981 | 6.3 | 0.66 | 19% | 9% |

The ink was inkjet UV printed and post-cured from RT to 220° C. with a heating ramp of 1K/min.
The final properties of the final object were:
Tensile strength: 50 MPa,
Elongation at break: 2.0%,
E-Modulus: 2000 MPa.
Green Body Measurement:

| Example A-4 | |
| --- | --- |
| Length [mm] | Thickness [mm] |
| UV-curing | |
| 40 | 4 A |
| UV-curing + Thermal curing | |
| 40 | B |

Post Curing Type B Examples (Isocyanate Thermal Curing):

Example B

Synthesis of Blocked Isocyanate (BI)
Hexamethylendiisocyanate (DESMODUR N3400; 304.99 g; 2.92 mol; 1 eq.) was mixed with K-KAT® XK-651 (KING INDUSTRIES, Bismuth-Carboxylate based; 4.4 g; 0.94 wt. %) in a 4-neck reactor (2500 mL) and stirred for 30 min at 50° C. Then, ε-Caprolactam (165.18 g; 1.46 mol; 2 eq.) was added at 50° C. and further stirred for 3.5 h at 60° C.
Synthesis of the Inkjet Composition
Isobornlyacrylate (34.5 wt %), Polyethylene glycol 600 diacrylate (12.0 wt %), 2-[[(butylamino)carbonyl]oxy]ethyl acrylate (12.0 wt %), Omnirad 819 (1.2 wt %), Genorad 16 (0.2 wt %), BYK 333 (0.2 wt %), hexanediol (10.9 wt %), and the above-synthesized blocked isocyanate compound BI 1 (29.0 wt %) were mixed and filtered over 1 μm. The ink was ink-jet UV printed and post-cured at 130° C. for 10 h.

| Example B Compound | Wt % in formulation | Mol of functionality (for 100 g final formulation) | % of all UV-curing functionalities | % of all curing functionalities |
| --- | --- | --- | --- | --- |
| IBOA | 34.5 | 0.165 | 63% | 27% |
| PEG 600 DA | 12 | 0.04 | 15% | 6% |
| Genomer 1122tf | 12 | 0.055 | 21% | 9% |
| Hexanediol 1,6 | 10.9 | 0.184 |  | 30% |
| BI 1 | 29 | 0.175 |  | 28% |

Genomer 1122tf is 2-[[(butylamino)carbonyl]oxy]ethyl acrylate.
The final properties of the final object were:
Maximal tensile strength: 7 MPa,
Elongation at break: 100%,
E-Modulus: 20 MPa.

| Formulation | Time [days] at 60° C. | Viscosity at 60° C. [mPa · s] |
| --- | --- | --- |
| Example polyurethane | 0 | 22 |
|  | 7 | 20 |

Post Curing Type C Examples (Epoxide Thermal Curing):

Example C-1

Isobornylacrylate (28.95 wt %), acryloyl morpholine (15 wt %), trimethylpropane triacrylate (15 wt %), Omnirad 819 (0.6 wt %), Genorad 16 (0.25 wt %), BYK 333 (0.2 wt %), 3,4-epoxycyclohexylmethyl 3,4-epoxycyclohexanecarboxylate (22 wt %), diglycidyl ether of bisphenol A (19.2 wt %) and K-PURE® CXC1612 (0.8 wt %) were mixed and filtered over 1 μm. The ink was inkjet UV printed and post-cured as follows: 30-100° C. at 1K/min, 130° C./10 h, 130-160° C. at 1 K/min, 160° C./10 h, 160-190° C. at 1 K/min, 190° C./4 h, 190-30° C. at −5 K/min.
The final properties of the final object were:
Tensile strength: 57 MPa
Elongation at break: 1,8%
E-Modulus: 3400 MPa.
HDT B: 134° C.

The viscosity stability of Example C-1 is measured to be as following:

| Formulation | Time [days] at 60° C. | Viscosity[1] at 50° C. [mPa · s] |
|---|---|---|
| Example C-1 | 0 | 15 |
|  | 2 | 18 |
|  | 7 | 21 |

| Example 1 Compound | Wt % in formulation | Mol of functionality (for 1 kg final formulation) | % of all UV-curing functionalities | % of all curing functionalities |
|---|---|---|---|---|
| IBOA | 15.3 | 1.39 | 35% | 20% |
| ACMO | 6.5 | 1.06 | 27% | 15% |
| TMPTA | 6.8 | 1.52 | 38% | 21% |
| Cyclic aliphatic Epoxy | 55.3 | 1.74 |  | 25% |
| Linear aliphatic epoxy | 14 | 1.35 |  | 19% |

Example C-2

Isobornylacrylate (15.3 wt %), acryloyl morpholine (6.5 wt %), trimethylpropane triacrylate (6.8 wt %), Omnirad 819 (1 wt %), Genorad 16 (0.2 wt %), BYK 333 (0.2 wt %), 3,4-epoxycyclohexylmethyl 3,4-epoxycyclohexanecarboxylate (55.3 wt %), polypropylene glycol diglycidyl ether (14.0 wt %) and K-PURE® CXC2689 (0.7 wt %) were mixed and filtered over 1 Pm.

| Example C-2 Compound | Wt % in formulation | Mol of functionality (for 1 kg final formulation) | % of all UV-curing functionalities | % of all curing functionalities |
|---|---|---|---|---|
| IBOA | 15.3 | 0.73 | 39% | 10% |
| ACMO | 6.5 | 0.46 | 24% | 7% |
| TMPTA | 6.8 | 0.68 | 37% | 10% |
| Cyclic aliphatic Epoxy | 55.3 | 4.38 |  | 63% |
| Linear aliphatic epoxy | 14 | 0.73 |  | 11% |

The ink was inkjet UV printed and post-cured as follows: 30-100° C. at 1K/min, 100° C./1 h, 100-130° C. at 1 K/min, 130° C./2 h, 130-145° C. at 1 K/min, 145° C./2 h, 145-160° C. at 1 K/min, 160° C./2 h, 160-30° C. at −5 K/min.

The final properties of the final object were:

Tensile strength: 79 MPa

Elongation at break: 3.1%

E-Modulus: 3100 MPa.

HDT B: 149° C.

The viscosity stability of Example C-2 is measured to be as following:

| Formulation | Time [days] at 60° C. | Viscosity[1] at 60° C. [mPa · s] |
|---|---|---|
| Example C-2 | 0 | 11 |
|  | 7 | 18 |

The invention claimed is:

1. An inkjet composition for additive manufacturing, the composition comprising:
   at least one photocurable compound including one or more acryloyl groups, at least one thermocurable compound including one or more thermal curable groups, and a radical photoinitiator,
   the at least one photocurable compound being different from the at least one thermocurable compound,
   a molar ratio of acryloyl groups to thermal curable groups in the inkjet composition ranging from 0.30 to 3.0,
   a total amount of acryloyl groups in the inkjet composition ranging from 1.4 to 4.6 mol/kg, and
   the inkjet composition having a viscosity stability in that the viscosity measured after 168 h does not increase from the initial viscosity by more than 300% at 60° C.

2. The inkjet composition according to claim 1, further comprising one or more of a bifunctional and a trifunctional crosslinker.

3. The inkjet composition according to claim 1, further comprising a metal catalyst.

4. The inkjet composition according to claim 1, including less than 6 wt. % of radically photopolymerizable monomers not including at least one acryloyl group, based on the total weight of the inkjet composition.

5. The inkjet composition according to claim 1, including less than 8 wt. % of inert solvent based on the total weight of the inkjet composition.

6. The inkjet composition according to claim 1, the one or more thermal curable groups including any one or more of a cyanate ester group, an isocyanate group, and an epoxy group.

7. The inkjet composition according to claim 1, the at least one thermocurable compound being in a blocked form.

8. The inkjet composition according to claim 1, the at least one thermocurable compound including a blocked isocyanate group.

9. The inkjet composition according to claim 1, comprising no cationic photoinitiator.

10. The inkjet composition according to claim 1, including less than 6 wt. % of radically photopolymerizable monomers including one or more methacryloyl groups, based on the total weight of the inkjet composition.

11. The inkjet composition according to claim 1, including substantially no compounds that thermally react at temperatures below 100° C. by one or more of polyaddition or polycondensation.

12. The inkjet composition according to claim 1, having a green body strength after being photo-cured and before being thermo-cured of A or B.

13. The inkjet composition according to claim 1, a total amount of acryloyl groups in the inkjet composition ranging from 1.1 to 4.9 mol/kg.

14. A method of manufacturing a three-dimensional object, the method comprising:
   dispensing an inkjet composition, the inkjet composition comprising:
   at least one photocurable compound including one or more acryloyl groups, at least one thermocurable compound including one or more thermal curable groups, and a radical photoinitiator, the at least one photocurable compound being different from the at least one thermocurable compound, and a molar ratio of acryloyl groups to thermal curable groups in the inkjet composition ranging from 0.30 to 3.0, a total amount of acryloyl groups in the inkjet composition ranging from 1.4 to 4.6 mol/kg, irradiating the dispensed inkjet composition, and thermo-processing the irradiated inkjet composition; the inkjet composition having a viscosity stability in that the viscosity measured after 168 h does not increase from the initial viscosity by more than 300% at 60° C.

15. The method according to claim 14, further comprising again dispensing the inkjet composition and then irradiating the dispensed inkjet composition before conducting any thermo-processing.

16. The method according to claim 14, the one or more thermal curable groups including any one or more of a cyanate ester group, an isocyanate group, and an epoxy group.

17. The method according to claim 14, the inkjet composition comprising no cationic photoinitiator.

18. A three-dimensional object prepared by a process comprising:

dispensing an inkjet composition, the inkjet composition having a viscosity stability in that the viscosity measured after 168 h does not increase from the initial viscosity by more than 300% at 60° C., the inkjet composition comprising:

at least one photocurable compound including one or more acryloyl groups, at least one thermocurable compound including one or more thermal curable groups, and a radical photoinitiator, the at least one photocurable compound being different from the at least one thermocurable compound, and a molar ratio of acryloyl groups to thermal curable groups in the inkjet composition ranging from 0.30 to 3.0, a total amount of acryloyl groups in the inkjet composition ranging from 1.4 to 4.6 mol/kg, irradiating the dispensed inkjet composition, and thermo-processing the irradiated inkjet composition.

19. The three-dimensional object according to claim 18, the one or more thermal curable groups including any one or more of a cyanate ester group, an isocyanate group, and an epoxy group.

20. The three-dimensional object according to claim 18, the inkjet composition comprising no cationic photoinitiator.

* * * * *